Patented Nov. 25, 1947

2,431,614

UNITED STATES PATENT OFFICE 2,431,614

MOLDED SADIRON COMPOSITION

Louis Hoffman, Duluth, Minn.

No Drawing. Application August 26, 1944,
Serial No. 551,454

2 Claims. (Cl. 38—88)

The principal object of the instant invention is the production of a plastic, insulating composition especially suitable for the housing and/or pressing face of sadirons, such for example, as illustrated in my last Patent No. 2,278,370, dated March 31, 1942, No. 1,737,047, dated November 26, 1929, and several other former patents. This composition, when used to form the pressing face of an iron, has been found admirable for such purpose, in that the forming of the well known objectionable shiny or glossy surface on some classes of material after ironing, is entirely eliminated, and the insulating properties of which composition lessens the danger of burning the material being ironed.

My composition consists of a mixture of water glass, as commonly found on the market, finely powdered pure asbestos, or the like, and very finely ground and powdered glass.

In preparing the composition, I prefer to use the ingredients in about the following proportions: ten pounds of water glass, ten pounds of asbestos and five pounds of powdered glass, the latter being used particularly for the ultimate hardening of the exterior surface of the product for example, in the pressing face of the iron, thus subject to greater variation of proportions to the other ingredients used in the composition.

It is further found that the water glass has sufficient fluid properties to form the ideal plastic condition for subsequent molding without adding any water whatever when being mixed.

The ingredients are thoroughly mixed together forming a paste-like product which is subsequently shaped in a mold to the form desired under heat and pressure simultaneously to obtain the desired density.

Equally good results may be accomplished with some change in the proportion in relation to the final heat and pressure applied to the product, without departing from the spirit of the invention.

When the entire housing of the iron is formed of this material the objectionable radiation of heat from the interior of the iron through the housing is materially lessened and thus conserved for use where needed.

This composition has also been found ideal for enclosing the electric heating element, or elements, common to such steam sadirons, and for which purpose it may be found advantageous to materially lessen the proportion of finely powdered glass.

Having thus described my invention, what I claim and desire to secure by Letters Patent is:

1. A molded sadiron pressing face composed of about 40% of water glass, about 40% of powdered asbestos and about 20% of powdered glass.

2. A sadiron the housing and pressing face of which are composed of a plastic heat insulating composition of matter containing about 40% of water glass, about 40% of powdered asbestos and about 20% of powdered glass.

LOUIS HOFFMAN.

REFERENCES CITED

The following references are of record in the file of this patent:

UNITED STATES PATENTS

| Number | Name | Date |
|---|---|---|
| 277,043 | Lumbye | May 8, 1883 |
| 1,870,245 | Fisher | Aug. 9, 1932 |

FOREIGN PATENTS

| Number | Country | Date |
|---|---|---|
| 13,018 | Great Britain | 1913 |